United States Patent
Huang et al.

(10) Patent No.: US 7,136,647 B2
(45) Date of Patent: Nov. 14, 2006

(54) METHOD FOR DECIDE CDMA FREQUENCY HARD HANDOFFS

(75) Inventors: Shenghua Huang, Shenzhen (CN); Tao Zheng, Shenzhen (CN); Fusheng Zhu, Shenzhen (CN); Bin Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 10/523,936

(22) PCT Filed: Jul. 15, 2003

(86) PCT No.: PCT/CN03/00567

§ 371 (c)(1),
(2), (4) Date: Feb. 7, 2005

(87) PCT Pub. No.: WO2004/015901

PCT Pub. Date: Feb. 19, 2004

(65) Prior Publication Data

US 2005/0260990 A1   Nov. 24, 2005

(30) Foreign Application Priority Data

Aug. 8, 2002   (CN) .................................. 02 1 36456

(51) Int. Cl.
H04Q 7/20   (2006.01)

(52) U.S. Cl. .................. 455/440; 455/436; 455/439
(58) Field of Classification Search ........ 455/436–444, 455/446, 450, 452.2, 560; 370/335, 342, 370/441
See application file for complete search history.

(56) References Cited

U.S. PATENT DOCUMENTS

| 5,517,491 | A | * | 5/1996 | Nanni et al. ................. 370/252 |
| 6,198,937 | B1 | | 3/2001 | DeClerck et al. |
| 6,208,631 | B1 | | 3/2001 | Kim |
| 6,259,919 | B1 | * | 7/2001 | Suonvieri et al. ........... 455/441 |
| 6,449,481 | B1 | | 9/2002 | Kwon et al. |
| 6,556,834 | B1 | * | 4/2003 | Kobayashi et al. ......... 455/464 |
| 2002/0093922 | A1 | | 7/2002 | Grilli et al. |
| 2002/0187801 | A1 | * | 12/2002 | Vanghi ....................... 455/522 |
| 2003/0058828 | A1 | | 3/2003 | Sarkar et al. |

FOREIGN PATENT DOCUMENTS

| CN | 1221304 A | 6/1999 |
| CN | 1239391 A | 12/1999 |
| CN | 1350758 A | 5/2002 |
| WO | WO 00/60891 | 10/2000 |
| WO | WO 01/11914 A1 | 2/2001 |

* cited by examiner

Primary Examiner—Eliseo Ramos-Feliciano
Assistant Examiner—Dai Phuong
(74) Attorney, Agent, or Firm—Foley & Lardner LLP

(57) ABSTRACT

This invention discloses a method for controlling inter-frequency hard handoffs by using user equipment(UE) event-triggered reporting mode in a WCDMA system, being applicable to geographical cells covered by multiple frequency points. Its main technical feature is that the radio network controller (RNC), after receiving reported results from the UE, performs the decision and execution according to the specific events. This method has the advantages of a reasonable logic and high efficiency, being able to well ensure the realization of the inter-frequency handoffs required by a WCDMA system, improved communication quality, reduced transmission power of the UE, reduced interference to other cells, and increased system capacity, etc.

12 Claims, 3 Drawing Sheets

METHOD FOR DECIDE CDMA FREQUENCY HARD HANDOFFS

TECHNICAL FIELD OF THE INVENTION

The present invention relates to communication technologies, and in particular to a decision method for inter-frequency handoffs in a Wideband Code Division Multiple Access (WCDMA) system.

TECHNICAL BACKGROUND OF THE INVENTION

With mobile communication systems being applied more and more widely, many of the key techniques become more and more perfect, but there are still some problems needing solution, among which is that of cell handoffs. In a cellular wireless communication system, the coverage area of the wireless communication system consists of numerous partially overlapping cells. When a mobile user is moving in this area, it often occurs that the mobile user connected to a cell handoffs from one cell to another. In the first and second generation cellular mobile communication systems, the frequency used by a specified cell cannot be used again by the adjacent cells, that is, the cells that use a same frequency should have an interval in space between them to ensure frequency multiplexing. Consequently, handoffs of a mobile user between cells are mainly performed between channels with different frequencies, when the handoffs can incur a period of interruption in the voice transmission, leading to the phenomenon of interruption in the communication, and are called hard handoffs.

With the emergence of the third generation mobile communication systems, the soft handoff technique with its advantages in a WCDMA system has increasingly found applications, wherein a user equipment (UE), when establishing a connection with a new cell during movement, does not sever the connection with the original cell immediately, but performs a soft handoff on the same frequency point, thereby reducing the call drop rate significantly. Because the frequency multiplexing factor in a third generation system can reach up to 1, adjacent cells can use a same frequency, making possible soft handoffs between different cells, thus enhancing the communication quality of the entire system.

Similar to a GSM system (Global System for Mobile Communication), a WCDMA system may use multiple frequency points in some user-intensive hotspots to enhance the system capacity, thus forming multiple coverage, and in this case, during the movement of a UE, either variations of the surrounding environment or increase of the number of the users on the currently used frequency point may cause the deterioration of the communication quality of the UE, and only soft handoffs within a frequency may not well satisfy the requirements of the UE on the communication quality, so in areas covered by multiple frequency points, it is necessary to consider employing inter-frequency hard handoffs in order to achieve a better communication quality. Before implementing a hard handoff, it is needed to evaluate comprehensively the communication qualities on different frequency points, and when the conditions are appropriate, handoff the UE to the frequency point with the best quality in time, that is, to perform an inter-frequency hard handoff. Because a hard handoff may possibly cause a call drop, how to reduce the risk of call drops is a key point needing to be considered in a handoff scheme.

A WCDMA system has many its own unique features as compared with other systems such as a GSM system and a CDMA system, and its development period in every countries has been relatively short, so there are not yet many existing technologies that can be tapped on in terms of specific handoff implementations, and in disclosed patents no relevant content on inter-frequency hard handoffs has been found.

SUMMARY OF THE INVENTION

Employing different inter-frequency hard handoff implementations has great impact on the system performance: first, in order to improve the communication quality of some UEs, it is necessary for the system to implement inter-frequency hard handoffs. In other words, regardless of the specific implementation scheme, the implementation of the inter-frequency hard handoff function should be a basic function of the system; otherwise the communication quality may be greatly affected. In existing WCDMA systems, no practical and relatively excellent solution has yet been disclosed by equipment providers; second, what method to use to implement the inter-frequency hard handoff function in order to obtain the best handoff performance, that is, to improve the communication quality of the UE while at the same time reduce the risk of call drops, is extremely important for ensuring the performance of the entire system; third, while implementing the inter-frequency hard handoff function, it is necessary to consider the processing capacity of the system. Too much processing at the radio network controller (RNC) side may create a bottleneck, having relatively severe impact on the system capacity. The present invention is to propose a solution of inter-frequency hard handoffs in a WCDMA system. In the Specification 3GPP TS 25.331, it is specified that in a WCDMA system, two reporting modes, which are the periodic reporting and the event-triggered reporting mode, can be selected for the reporting of the measurement reports of the UE. The technical solution of the present invention employs the event-triggered mode, solving the above problem pretty well.

This method is proposed mainly with reference to the event-triggered reporting mode. This method utilizes substantially the events defined in the Specification 3GPP TS 25.331, uses them in combination selectively and reasonably, on the one hand avoiding as much as possible frequent and unnecessary inter-frequency handoffs, and on the other hand making the UE obtain as much radio link support as possible during the inter-frequency handoffs so as to reduce the risk of call drops.

The use of the method of the present invention requires two preconditions: (1) the geographical cell where the UE is should have multiple frequency points coverage, otherwise inter-frequency hard handoffs cannot possibly occur; (2) in the measurement control commands the event-triggered reporting scheme is used.

The events in the Specification 3GPP TS 25.331 referred to in the present invention are described as follows:

(1) Event 2A: The best frequency point changes, that is, there is a non-current frequency point at which the signal quality is better than the signal quality on the current frequency point.

(2) Event 2D: The signal quality on the current frequency point is lower than a certain threshold.

(3) Event 2F: The signal quality on the current frequency point is higher than a certain threshold.

The decision method for inter-frequency hard handoffs with event-triggered reporting proposed by the present invention comprises the following steps:

Step 1, the RNC queries the specific conditions of the geographical cell where the UE is, and activates the compression mode to perform inter-frequency measurements, specifying the measurement events to be 2F and 2D and the relative threshold values.

Step 2, the RNC sends a measurement control command to the UE, the message including the events that the UE is required to report specifically and their parameters.

Step 3, the UE receives the control command sent by the RNC, and performs measurement according to the specific measurement requirements; and send the message of the measurement report when the triggering criteria of the specifical events are met. The evaluation of the comprehensive quality on a certain frequency point at the UE side uses the following formula:

$$Q_{carrierj} =$$
$$10 \cdot LogM_{carrierj} = W_j \cdot 10 \cdot Log\left(\sum_{i=1}^{N_{Aj}} M_{ij}\right) + (1 - W_j) \cdot 10 \cdot LogM_{Bestj} - H,$$

wherein, $Q_{carrierj}$ is the dB value of estimated quality on frequency j;

$M_{carrierj}$ is the estimated quality on frequency j;

$M_{ij}$ is a measurement result of cell i in the active set on frequency j (in case of a non-used frequency point, they are the cells in the virtual active set);

$N_{Aj}$ is the number of cells in the active set on frequency j;

$M_{Bestj}$ is the measurement value of the best cell on frequency $W_j$ is the weight factor for frequency j;

H is the hysteresis parameter;

Step 4, after receiving the reported results, the RNC begins to decide which event has been triggered, and the process goes to Step 5;

Step 5, if it is decided that the event reported by the UE is 2F, then the process goes to Step 6, otherwise it goes to Step 7;

Step 6, it is specified that the next event that the UE is required to report is 2D, and the parameters are configured, then the process goes to Step 2;

Step 7, if it is decided that the event reported by the UE is F2D, then the process goes to Step 8, otherwise it goes to Step 9;

Step 8, it is specified that the next event that the UE is required to monitor is 2A and 2F, and the parameters are configured, then the process goes to Step 2;

Step 9, if it is decided that the event reported by the UE is 2A, then the process goes to 10, otherwise it goes to Step 12;

Step 10, the admission control is performed and the relative resource is allocated in the corresponding cell of the virtual active set; and the process goes to Step 11;

Step 11, if the handoff is confirmed, RNC sends the handoff command to the UE, which then performs the measurements and reporting of Event 2F and 2D on the new frequency point; if the handoff cannot be performed, then the UE is required to continue with the measurements and reporting of Event 2A and 2F on the original frequency point. The process goes to Step 2;

Step 12, the event is ignored, and the process continues to wait for new reported events from the UE, and goes to Step 4.

The implementation of the decision method for inter-frequency hard handoffs in a WCDMA system provided by the present invention proposes a definite solution to the decisions of inter-frequency hard handoffs in a WCDMA system from the perspective of practicality. This solution has the following advantages: (1) it has a reasonable logic and high efficiency, can well ensure the realization of the inter-frequency handoffs required by a WCDMA system, can improve the signal quality of a user's communication as far as possible, reduce the transmission power of the UE, and reduce the interference to other cells. (2) The introduction of the reasonable hysteresis parameter and the first decision of Event 2F can avoid frequent handoffs, lowering the risk of call drops. (3) The use of the event-triggered reporting mode can avoid too many message exchanges between the UE and the RNC, significantly reduce the processing amount of the RNC, thereby helping to enhance the capacity of the entire system.

BRIEF DESCRIPTION OF THE ACCOMPANYING DRAWINGS

PREFERRED IMPLEMENTATION OF THE INVENTION

The present invention utilizes substantially the measurement results reporting triggered by UE events in a WCDMA system, controls and decides on the events and measurement results to be reported by the UE thoroughly, thereby deciding whether it is necessary to perform an inter-frequency hard handoff.

The implementation of the technical solution will now be described in detail with reference to the accompanying drawings:

The use of the method of the present invention in a WCDMA requires that first, the geographical cell where the UE is should have multiple frequency points coverage, otherwise inter-frequency hard handoffs cannot possibly occur; second, in the measurement control commands the event-triggered reporting scheme should be used. And moreover, only when the UE is in the CELL_DCH state, can this method be used, and when the UE is in another state, such as the CELL_PCH, URA_PCH, and CELL_FACH state, because the UE has no dedicated physical channel and will not perform cell handoffs, this method will not usually be used. But this method still does not exclude its applicability in other states.

Figure 1:
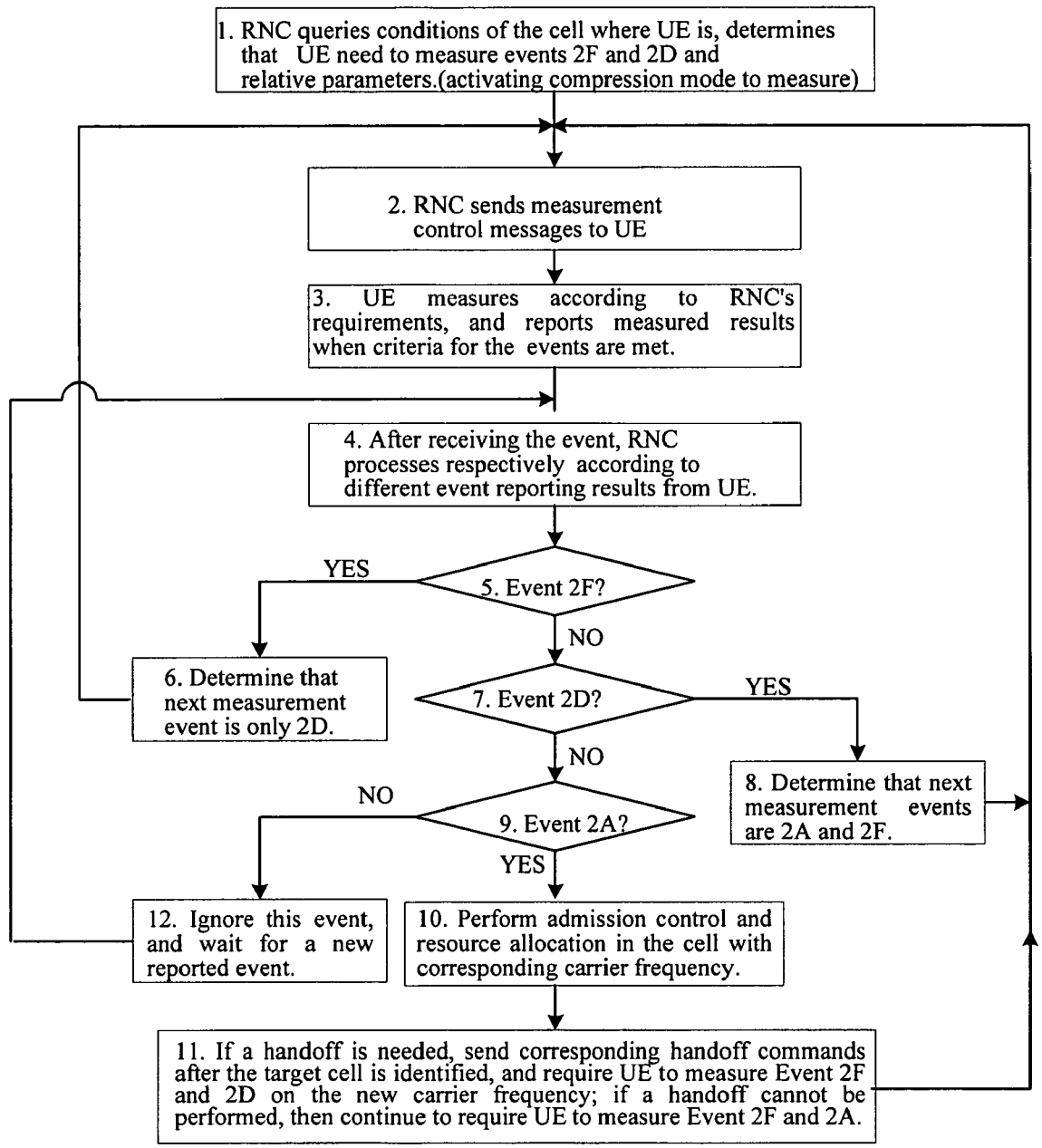
FIG. 1 is the event-triggered inter-frequency handoff decision scheme 1.

The flowchart of the core idea of said method of the present invention is depicted in FIG. 1, which shows that:

(1) The RNC sends measurement control commands to the UE, specifying the physical quantities that the UE is required to measure, the physical quantities to be reported, the filter factors for the measurements (used for filtering measured values in the UE), the cell information to be measured, the measurement report mode (specified as the event-triggered mode), the number of the measurement reports to be reported, the reporting interval of the measurement reports and other parameters that are relevant to the handoffs. The purpose is to make the UE perform measurements according to specific requirements specified by the RNC, wherein the provision of some of the information can facilitate the fast measurement by the UE.

(2) After receiving the measurement control information, the UE begins to perform measurements according to the specific requirements in the command, and filter the measurement results with the filter factor specified in the measurement control command, evaluate comprehensively the measured signals on every frequency points, and when the criteria for the events required to be reported are met, upload the measurement results to the RNC with a measurement report message. The purpose is that all the measurement results reported by the UE allow the RNC to have an adequate reference basis when performing the next measurement control and deciding whether to perform a handoff.

(3) The respective decision and control are performed according to the specific event reported by the UE. For example, the decision of Event 2F in the UE is to see whether the signal quality on the frequency point currently used by the UE is trustworthy. If the event reported by the UE if 2F, then inter-frequency handoffs will not be considered at all, even if there is a better frequency point on which the signal quality is better, considering that the signals on the current frequency point are trustworthy. Because hard handoffs may cause call drops, and once a call drop occurs, the business service quality will be severely affected, when Event 2F is met, it can avoid having to bear the risk of potential call drops caused by inter-frequency hard handoffs not to consider performing handoffs, and only to require the UE to continue with the triggered reporting of Event 2D. Only when Event 2D is triggered, indicating that at this time the signal quality on the current frequency point is no longer quite good, and the time comes when the problem of performing inter-frequency hard handoffs can be considered in order to make the UE to obtain a better communication quality, will the UE be required to perform the decisions on Event 2A and 2F. This is because that before Event 2A is triggered, the signal quality on the current frequency point may have returned again to a state quite good (that is, Event 2F has been triggered).

(4) Once Event 2A is triggered, indicating that the signal quality on the current frequency point is not quite good, but at this time there is a frequency point on which the signal quality is better, it is considered to perform an inter-frequency hard handoff, that is, to perform the admission control and resource allocation in the cells of the virtual active set.

(5) If it is decided that Event A has occurred, then further actions required for determining whether a handoff can be performed should by taken, that is, the admission control and code resource allocation are performed in the cells with the corresponding frequency point, and if it can be admitted and the code resources can be allocated in the (possibly multiple) cells of the virtual active set with the different frequency, then these cells are specified as the target cells, and it is prepared to perform the inter-frequency hard handoff, and perform the measurements and reporting of Event 2F and Event 2D in the new frequency point. Here, these can be performed with the following several commands: (a) RADIO BEARER SETUP, (b) RADIO BEARER RECONFIGURATION, (c) RADIO BEARER RELEASE, (d) TRANSPORT CHANNEL RECONFIGURATION, (e) PHYSICAL CHANNEL RECONFIGURATION. If it is not admitted in the cells with the different frequency (that is, the code resources cannot be allocated), then the inter-frequency handoff action will not be performed at this time, and the UE is commanded to start the decisions and reporting of Event 2F and Event 2A.

Figure 2:
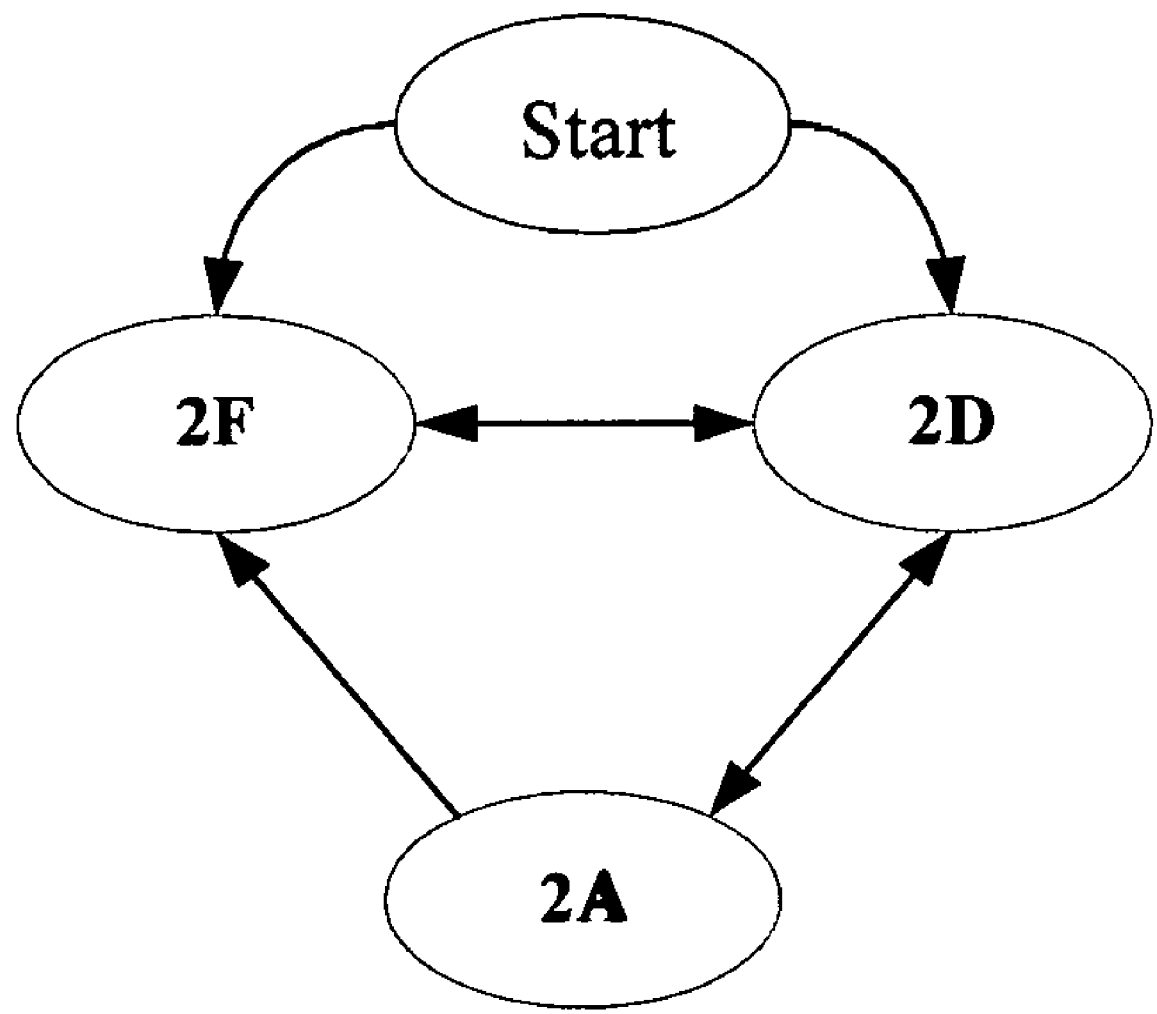
FIG. 2 is the control flow of the inter-frequency handoff events.

FIG. 2 is a flowchart of the event control in the decision method for inter-frequency handoffs with event-triggered reporting according to the present invention. This is an event decision sequence designed according to the correlations between the inter-frequency measurement events. The directions indicated by the arrows in FIG. 2 show the events needing to be further decided on after the current event is triggered, specifically as follows:

(1) When requiring the UE to perform the initial measurements, the RNC sends a measurement control message command, requiring the UE to perform the decisions on Event 2F and Event 2D (the setting of the corresponding threshold parameters is required) in order to see whether the signal quality on the current frequency point is trustworthy.

(2) When Event 2F is triggered and reported, indicating that the performance of the UE using the current frequency is quite good, it is unnecessary to consider to perform a handoff (even if there is a frequency point with better quality, the handoff is still unnecessary, because a hard handoff itself may cause a call drop, thus affecting the service quality), and at this time the UE is required to perform the decision on Event 2D (the RNC notifies the UE). The threshold for Event 2F can be set higher than the threshold for Event 2D by about 2 dB, in order to avoid too much alternating occurrences of the two events.

(3) If at some time Event 2D is triggered, indicating that performance of the UE using the current frequency is no longer quite good, and there may be some other frequencies that suit the UE better, then the UE is commanded to perform the decisions on Event 2A and Event 2F.

(4) When Event 2A is triggered and reported, indicating that there is a new frequency that can be used by the UE, and the performance by using this frequency is better than that on the current frequency, the RNC determines whether to perform an inter-frequency hard handoff according to the results of the admission control and resource allocation, and sends the corresponding message to the UE. If the results are changing the frequency and the change at the UE side is successful, it means that the inter-frequency hard handoff occurs. The UE will reconfigure parameters according to the physical channel provided by the RNC, establish the new physical channel, and begin to exchange messages with the corresponding node B or base station B. At this time, the UE will restart the decisions on Event 2F and 2D under the control of the RNC on the new frequency being used.

Figure 3:
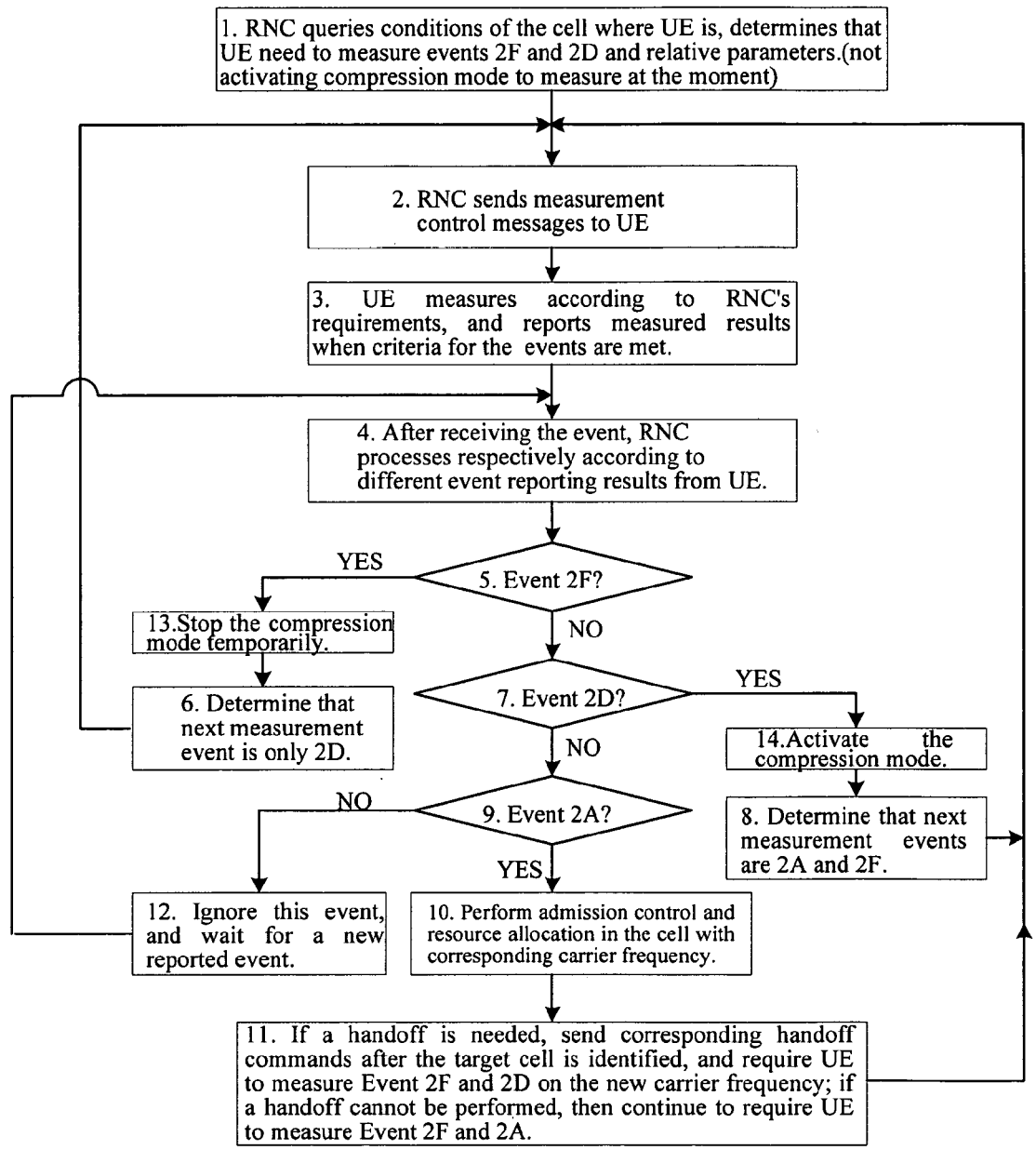
FIG. 3 is the event-triggered inter-frequency handoff decision scheme 2.

FIG. 3 is a flowchart of another decision method for inter-frequency hard handoffs with event-triggered reporting according to the present invention, wherein the use of the compression mode during the inter-frequency measurements is taken into account. The use of the compression mode may to some extent adversely affect the power control and the normal service, therefore the use of the compression mode will be stopped in unnecessary situations. This method added several steps to the method shown in FIG. 1, specifically as follows:

(1) Between Step 7 and Step 8 is added a step, that is, Step 14: after Event 2D is triggered and reported, the RNC commands the UE to activate the compression mode to perform the inter-frequency measurement, and at this time the measurements of the signal qualities in the cells on other frequency points begins to be performed.

(2) Between Step 5 and Step 6 is added a step, that is, Step 13: after Event 2F is triggered and reported, the RNC commands the UE to stop using the compression mode to perform the inter-frequency measurements, and at this time the measurements of the signal qualities in the cells is only performed on the currently used frequency.

The thresholds of Event 2D and Event 2F must have a difference between them (which can usually take the value of 2 dB), otherwise there may ensue too frequent activations and stops of the compression mode.

This method has also altered the concrete content of a step in the method as shown in FIG. 1, that is, in Step 1, the activation of the compression mode to perform the inter-frequency measurement as shown in FIG. 1 is changed to not activating for the moment the compression mode, that is, not performing the inter-frequency measurement temporarily.

The invention claimed is:

1. A decision method for inter-frequency hard handoffs in a WCDMA system, using an event-triggered reporting mode, and triggering events including: Event 2F having a triggering criteria where the signal quality on the current frequency point is higher than a certain threshold value, Event 2D having a triggering criteria where the signal quality on the current frequency point is lower than a certain threshold value, and Event 2A having a triggering criteria where the best frequency point changes, that is, where there is a non-current frequency point on which the signal quality is better than the signal quality on the current frequency point, the decision method comprising:

querying, by a RNC (Radio Network Controller), specific conditions of a location where the a UE (user equipment) is, and performing inter-frequency measurements, specifying required measurement events to be 2F and 2D and relative parameters;

sending, by the RNC measurement control commands to the UE, specifying the parameters that the UE is required to measure;

receiving by the UE, the control commands and performing the measurement and evaluation, and reporting the measurement results when the triggering criteria for the required events are met; and receiving, by the RNC, the reported measurement results from the UE, and beginning to perform the actions according to the specific events reported by the UE and the RNC's specific decision and execution process.

2. The decision method for inter-frequency hard handoffs according to claim 1, further comprising:

querying, by the RNC, the specific conditions of the location where the UE is and performing inter-frequency measurements in which a compression mode is activated to perform the measurements.

3. The decision method for inter-frequency hard handoffs according to claim 1, further comprising:

querying, by the RNC, the specific conditions of the location where the UE is and performing inter-frequency measurements in which the measurements are performed without activating a compression mode.

4. The decision method for inter-frequency hard handoffs according to claim 1, wherein the UE receives the control commands and performs the measurements and evaluation, the evaluation at UE side being based on the following formula:

$$Q_{carrierj} =$$

$$10 \cdot LogM_{carrierj} = W_j \cdot 10 \cdot Log\left(\sum_{i=1}^{N_{Aj}} M_{ij}\right) + (1 - W_j) \cdot 10 \cdot LogM_{Bestj} - H,$$

wherein:

$Q_{carrierj}$ is the dB value of estimated quality on frequency j;

$M_{carrierj}$ is the estimated quality on frequency j;

$M_{ij}$ is a measurement result of cell i in the active set on frequency j (in case of a non-used frequency point, they are the cells in the virtual active set);

$N_{Aj}$ is the number of cells in the active set on frequency j;

$M_{Bestj}$ is the measurement value of the best cell on frequency j;

$W_j$ is the weight factor for frequency j.

5. The decision method for inter-frequency hard handoffs according to claim 1, wherein said RNC's specific decision and execution process includes:

(A) when Event 2F is triggered, the RNC requires the UE to perform the decision on Event 2D;

(B) when Event 2D is triggered, the RNC requires the UE to perform the decisions on Event 2F and Event 2A;

(C) when Event 2A is triggered, the RNC makes a decision according to the results of an admission control and resource allocation and sends the corresponding message to the UE, and after the hard handoff is performed successfully, the UE performs again the decisions on Event 2F and 2D under the control of the RNC.

6. The decision method for inter-frequency hard handoffs according to claim 5, wherein after the Event 2F is triggered, the RNC can command the UE to stop using a compression mode to perform the inter-frequency measurements, and perform the measurements of the signal qualities in the cells only on the currently used frequency.

7. The decision method for inter-frequency hard handoffs according to claim 5, wherein after the Event 2D is triggered, the RNC can command the UE to activate a compression mode to perform the inter-frequency measurements, performing the measurements of the signal qualities in the cells on other frequency points.

8. The decision method for inter-frequency hard handoffs according to claim 1, wherein during the RNC's specific decision and execution process, there is a difference between the thresholds of Event 2F and Event 2D.

9. A WCDMA hard handoff system, which uses an event-triggered reporting mode, in which triggering events include: Event 2F having a triggering criteria where the signal quality on the current frequency point is higher than a certain threshold value, Event 2D having a triggering criteria where the signal quality on the current frequency point is lower than a certain threshold value, and Event 2A having a triggering criteria where the best frequency point changes, that is, where there is a non-current frequency point on which the signal quality is better than the signal quality on the current frequency point, the WCDMA hard handoff system comprising:

a Radio Network Controller (RNC); and
   a User Equipment (UE),
   wherein the RNC includes:
      querying means for querying specific conditions of a location where the UE is, and performing inter-frequency measurements, specifying required measurement events to be 2F and 2D and relative parameters; and
      sending means for sending measurement control commands to the Ue, specifying the parameters that the UE is required to measure; and
   wherein the UE includes:
      means for performing frequency measurements specifying required measurement events to be 2F and 2D and relative parameters, in accordance with the specific conditions queried by the querying means;

means for receiving the control commands sent by the sending means and performing the measurement and evaluation;

means for reporting the measurement results to the RNC when the triggering criteria for the required events are met, wherein the RNC further includes:

receiving means for receiving the reported measurement results from the UE; and performing means for performing actions according to the specific events reported by the UE and according to a specific decision and execution process of the RNC.

10. The decision method for inter-frequency hard handoffs according to claim 9, wherein said RNC's specific decision and execution process includes:

(A) when Event 2F is triggered, the RNC requires the UE to perform the decision on Event 2D;

(B) when Event 2D is triggered, the RNC requires the UE to perform the decisions on Event 2F and Event 2A;

(C) when Event 2A is triggered, the RNC performs an action according to the results of an admission control and resource allocation and sends the corresponding message to the UE, and after the hard handoff is performed successfully, the UE performs again the decisions on Event 2F and 2D under the control of the RNC.

11. The decision method for inter-frequency hard handoffs according to claim 10, wherein after the Event 2F is triggered, the RNC can command the UE to stop using a compression mode to perform the inter-frequency measurements, and perform the measurements of the signal qualities in the cells only on the currently used frequency.

12. The decision method for inter-frequency hard handoffs according to claim 10, wherein after the Event 2D is triggered, the RNC can command the UE to activate a compression mode to perform the inter-frequency measurements, performing the measurements of the signal qualities in the cells on other frequency points.

* * * * *

UNITED STATES PATENT AND TRADEMARK OFFICE
CERTIFICATE OF CORRECTION

PATENT NO. : 7,136,647 B2 Page 1 of 1
APPLICATION NO. : 10/523936
DATED : November 14, 2006
INVENTOR(S) : Shenghua Huang et al.

It is certified that error appears in the above-identified patent and that said Letters Patent is hereby corrected as shown below:

On the Title Page, item (54), and Col. 1, lines 1-2; please delete "METHOD FOR DECIDE CDMA FREQUENCY HARD HANDOFFS" and insert --DECISION METHOD FOR INTER-FREQUENCY HARD HANDOFFS IN A WCDMA SYSTEM--.

Signed and Sealed this
Twenty-eighth Day of August, 2012

David J. Kappos
*Director of the United States Patent and Trademark Office*